Aug. 5, 1924.

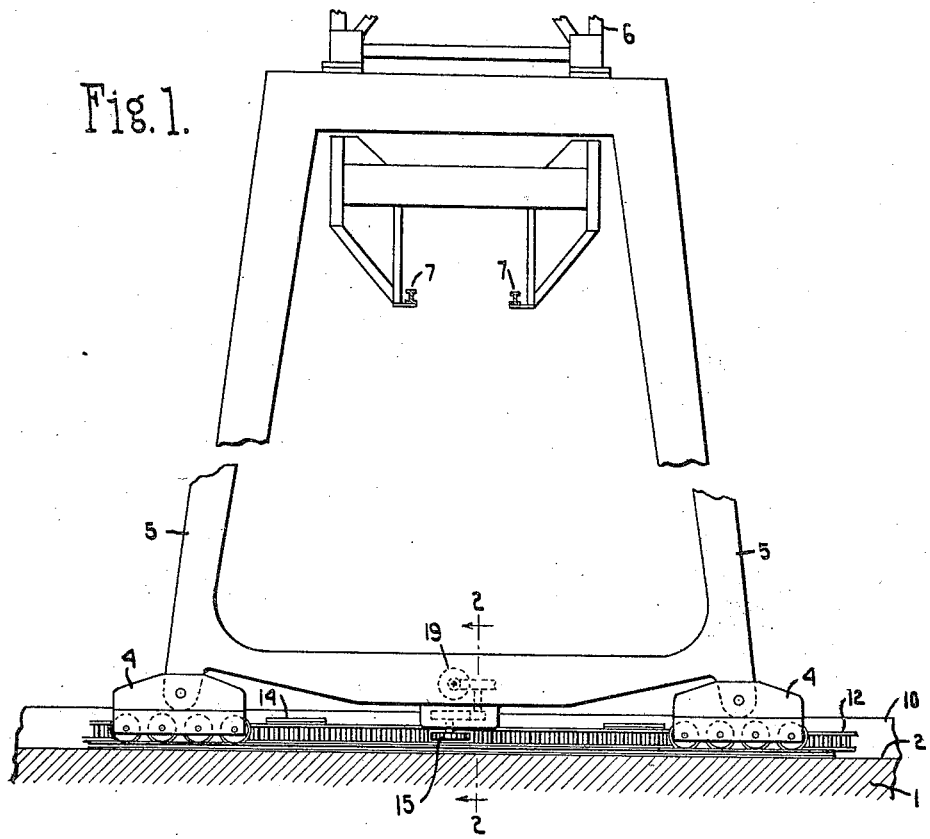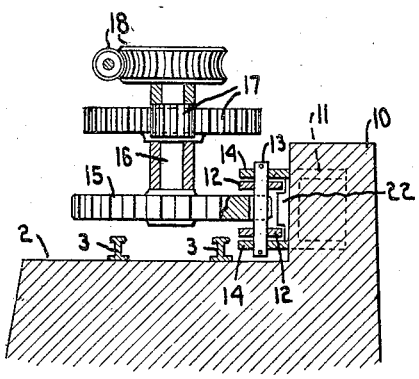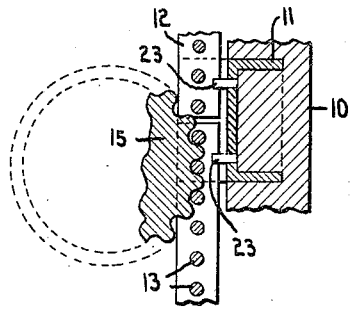

R. E. SHEAL 1,503,999

CONVEYING MACHINERY

Filed Oct. 2, 1922          2 Sheets-Sheet 2

INVENTOR.
Robert E. Sheal
BY Harold Elmer Smith
ATTORNEY.

Patented Aug. 5, 1924.

1,503,999

UNITED STATES PATENT OFFICE.

ROBERT E. SHEAL, OF CLEVELAND, OHIO.

CONVEYING MACHINERY.

Application filed October 2, 1922. Serial No. 591,821.

*To all whom it may concern:*

Be it known that I, ROBERT E. SHEAL, a citizen of the United States, residing at Cleveland, in the county of Cuyahoga and State of Ohio, have invented a certain new and useful Improvement in Conveying Machinery, of which the following is a full, clear, and exact description, reference being had to the accompanying drawings.

This invention relates to conveying and transporting machinery and was developed with special reference to travelling structures known as bridges for handling bulk material such as ore, coal, lime-stone, etc., although equally applicable to cog or rack drive railroads of all types, ship-towing devices, ship-building cranes, or of other types of travelling structures or apparatus of a similar nature wherein a cog or rack type of drive is used as a means of locomotion. The objects of the invention are the provision of a rack or cog-track which shall be comparatively inexpensive in construction, self-cleaning from obstructing material, and capable of being made up and fastened in sections; the provision of a new and improved relation between such track and the structure which is to be moved there-past; while further objects and advantages will become apparent as the description proceeds.

Figure 4:
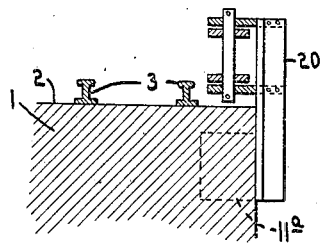
Figure 5:
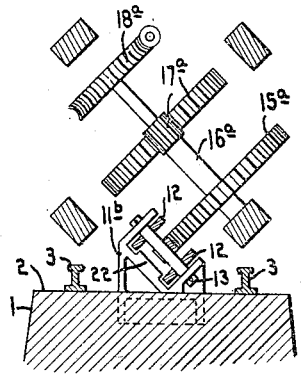
Figure 6:
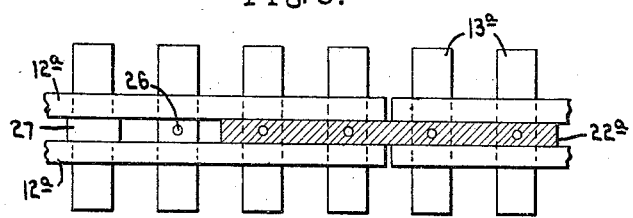
Figure 7:
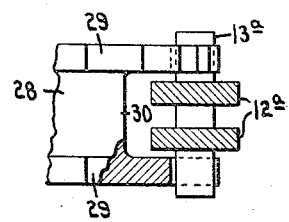
Figure 8:
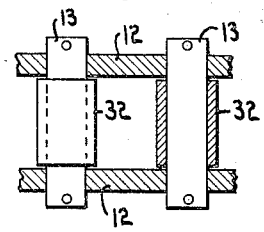
Figure 9:
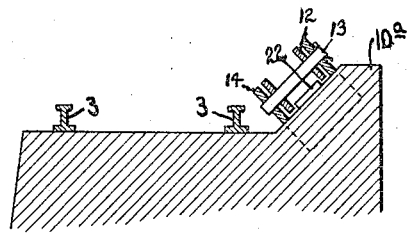

An ore-handling bridge is chosen for purposes of illustration since it exhibits to a marked degree the peculiar requirements of the problem in view, although I do not restrict myself thereto since certain other structures develop the same problem in a greater or less degree. An illustrative embodiment of my invention is diagrammatically shown in the drawings accompanying and forming a part of this application, wherein Fig. 1 is an end view of an ore-bridge embodying my improvements; Fig. 2 is a sectional view of the rack and driving mechanism corresponding to the line 2—2 of Fig. 1 and drawn to enlarged scale; Fig. 3 is a horizontal sectional view through the rack showing one of the anchors therefor; Fig. 4 is an illustration of a modified rack mounting; Fig. 5 illustrates another rack arrangement wherein the same, together with the driving mechanism is mounted at an oblique angle; Fig. 6 is a face view of a modified form of the rack; Fig. 7 is a sectional view of the rack shown in Fig. 6 illustrating the structure and relation thereto of the driving pinion employed therewith; Fig. 8 is a detail view of another rack modification; and Fig. 9 illustrates another position of the rack.

Describing the parts by reference characters, 1 represents the foundation having a flat top 2 constituting the runway or track on which the device is supported; 3 represents the rails; 4 the trucks running thereon, and 5—5 the legs of the bridge tower.

These towers may be two or more in number, and connected by a suitable truss 6 supporting a transverse track 7 along which runs a car or trolley (not shown). This truss is sometimes as much as several hundred feet long, and over one hundred feet high, while the weight of the entire travelling structure frequently amounts to many hundred tons. For convenience I have shown the trucks 4 as having only four axles each, although the weight is so great that ordinarily multiple trucks having many more axles are employed.

This foundation is ordinarily made of concrete and in Figs. 1, 2, and 3, I have shown the same as formed at one side with an integral upstanding wall 10 in which are imbedded at spaced points the anchor-members 11 to which the racks are fastened. Each rack comprises a pair of side bars 12—12 apertured at regular intervals for the cross pins 13. The anchors preferably comprise cheek plates 14 which overlap the side bars 12 and serve the double purpose of splice plates and anchorage devices, although separate splice plates can be used. In the embodiment shown in Figs. 1, 2, and 3, the cross-pins are vertical, although in the modification shown in Fig. 9 the face of the wall $10^a$ is inclined at an oblique angle and the rack is similarly inclined.

Carried by the moving structure is a pinion 15 meshing with the rack and rigidly secured to a shaft 16 journaled parallel with the rack pins. Power is applied to this pinion by means of suitable gearing here shown as containing spur gears 17 and worm gears 18 and a suitable motor 19.

In Fig. 4 the rack, instead of being supported by anchors imbedded in an upstanding wall, is carried by massive brackets 20 secured to other anchors $11^a$ imbedded in a lower part of the foundation. In Fig. 5 the rack is mounted in oblique position in suitable anchors $11^b$, here shown as located between the rails 3—3. With this arrangement, the pinion 15ª, shaft 16ª and gears 17ª, 18ª are also suitably inclined. In each of these cases suitable means is provided to keep the side bars 12 spaced apart, for example by forming each anchor with a suitable projection 22 engaging the upper bar and supporting it, or by projecting pins 23 as shown in Fig. 3.

In Figs. 6 and 7 I have shown a modified form of rack in which the side bars 12ª are located close together and the pins 13ª—13ª project considerably there-beyond. In this case the anchor is likewise provided with a portion at 22ª projecting between the side bars and itself constituting both the cheek plate and the splice plate. In the first embodiment the cross pins 13 are held in place by cotter pins outside the side bars while in Figs. 6 and 7 they are held in place by pins 26 located between these parts or by an enlargement 27 at this point. The pinion shown at 28 in Fig. 7 comprises a pair of spaced, toothed, flanges 29 adapted to engage the projecting ends of the pins, and separated by a groove 30 which straddles the side bars.

In Fig. 8 the side bars 12—12 are held apart by loose sleeves 32 which surround the various pins and serve the purpose not only of holding the side bars but of distributing the wear of the pinion, being so mounted as to rotate freely.

In all these embodiments the position of the rack enables all dirt, sand, ore, coal, ice, and other foreign matter to fall freely out of the same thereby permitting unimpeded use of the device at all times. It will be appreciated that the operator who drives a bridge of this character is never situated at a point where he can see both run-ways and is seldom so located as to be able to inspect even one of the same at all clearly. The same general considerations apply to the other classes of uses heretofore mentioned and I do not limit myself to any one use, neither do I limit myself to the features of construction, arrangement, or design herein illustrated, nor do I limit myself in any other manner except as specifically recited in the annexed claims.

Having thus described my invention, what I claim is:

1. In a device of the character described, the combination with a runway and a structure movable therealong, of a toothed driving device carried by said structure and rotatable in a plane disposed at a substantial angle to the vertical, and a rack carried by said runway and meshing with said device, said rack being supported above the surface of said runway and having one of its sides higher than the other and its lower side below any part of said device.

2. In a device of the character described, the combination with a runway and a structure movable therealong, of supporting means projecting above the surface of said runway and a rack carried by said supporting means, one side of said rack being substantially directly above the other whereby said rack is substantially vertical.

3. In a device of the character described, the combination with a foundation having a runway, of a rack supported entirely above said runway and having one side substantially directly above the other whereby said rack is substantially vertical.

4. In a device of the character described, the combination with a foundation having a runway, of a pair of spaced parallel side bars carried by said foundation one higher than the other and having spaced apertures therein, transverse pins in said apertures extending at a substantial angle to the horizontal and constituting rack teeth, and spacing devices interposed between said side bars to hold them apart.

5. In a device of the character described, a runway, a plurality of spaced supports secured thereto, a pair of rails extending along said runway and supported by said supports in such manner that one rail is higher than the other rail, and a plurality of pins extending between said rails and supported by said rails in a position at a substantial angle to the horizontal and substantially equally spaced along said rails.

6. In a device of the character described, the combination with a runway and an ore bridge movable therealong, of a pinion carried thereby, and a rack carried by said runway and meshing with said pinion, said rack comprising sidebars one higher than the other and cross-pins disposed at a substantial angle to the horizontal and being so arranged relatively to said runway as to be self cleaning.

7. In a device of the character described, the combination with a foundation and a pair of rails thereon, of a wheeled structure on said rails, a driving pinion carried by said structure, and a rack located at a higher level than said rails and meshing with said pinion, said rack comprising side-rails one substantially above the other and substantially vertical cross-pins and being so disposed relatively to said foundation as to be self cleaning.

8. In a device of the character described the combination with a foundation having a runway thereon, of spaced supporting members projecting above the surface of said runway, side-bars lapping by said members and having spaced apertures therein, and cross-pins in said apertures, said supporting members having cheek-pieces embracing the side-bars and spacing projections located between the side-bars.

9. In a device of the character described the combination with a foundation having a runway thereon, of spaced anchors carried by said foundation and having apertured cheek pieces, side bars lapping by said cheek pieces and having spaced apertures therein throughout their length, certain of said apertures registering with the apertures in the cheek pieces, and cross-pins in all said apertures, each anchor having portions which project between said side bars and hold them apart.

10. In a device of the character described the combination with a foundation having a runway thereon, of spaced anchors carried by and projecting above said foundation and having apertured cheek pieces at least one of which is located above the level of the runway, side bars lapping by said cheek pieces and having spaced apertures therein throughout their length, certain of said apertures registering with said first apertures, cross-pins in all said apertures, means for preventing endwise slipping of said pins, and other means for preventing sidewise movement of said bars.

11. In a device of the character described, a plurality of pins adapted to be formed into a rack, longitudinally extending means arranged to support said pins substantially equally spaced therealong and at a substantial angle to the horizontal, a plurality of spaced supports arranged to support said longitudinal means, and a runway arranged to support said supports.

In testimony whereof, I hereunto affix my signature.

ROBERT E. SHEAL.